US012669006B2

(12) United States Patent
Terenzi et al.

(10) Patent No.: US 12,669,006 B2
(45) Date of Patent: Jun. 30, 2026

(54) SIMPLIFIED MULTI-FUNCTION HINGE

(71) Applicant: C.M.I. CERNIERE MECCANICHE INDUSTRIALI S.R.L., Valsamoggia (IT)

(72) Inventors: Emanuele Terenzi, Sala Bolognese (IT); Federico Pizzi, Zola Predosa (IT)

(73) Assignee: C.M.I. CERNIERE MECCANICHE INDUSTRIALI S.R.L., Valsamoggia (IT)

( * ) Notice: Subject to any disclaimer, the term of this patent is extended or adjusted under 35 U.S.C. 154(b) by 8 days.

(21) Appl. No.: 18/871,931

(22) PCT Filed: Jun. 6, 2023

(86) PCT No.: PCT/EP2023/065147
§ 371 (c)(1),
(2) Date: Dec. 5, 2024

(87) PCT Pub. No.: WO2023/237564
PCT Pub. Date: Dec. 14, 2023

(65) Prior Publication Data

US 2025/0354422 A1 Nov. 20, 2025

(30) Foreign Application Priority Data

Jun. 9, 2022 (IT) ........................ 102022000012248

(51) Int. Cl.
*E05F 1/12* (2006.01)

(52) U.S. Cl.
CPC .......... *E05F 1/1253* (2013.01); *E05F 1/1261* (2013.01); *E05Y 2201/638* (2013.01); *E05Y 2900/304* (2013.01); *E05Y 2900/308* (2013.01)

(58) Field of Classification Search
CPC ..... E05F 1/1253; E05F 1/1261; E05F 1/1276; E05Y 2201/638; E05Y 2201/626;
(Continued)

(56) References Cited

U.S. PATENT DOCUMENTS 2,579,091 A * 12/1951 Rinaldo ................ F24C 15/023 16/322
3,712,287 A * 1/1973 Summers, Jr. ........ F24C 15/023 126/194
(Continued)

FOREIGN PATENT DOCUMENTS

CN 115450509 A * 12/2022 .............. A47J 36/12
DE 102009045888 B4 * 10/2025 ......... A47L 15/4261
(Continued)

OTHER PUBLICATIONS

International Search Report (ISR) and Written Opinion of the International Searching Authority (ISA/EP), International Application No. PCT/EP2023/065147 filed Jun. 6, 2023, maoled Aug. 31, 2023, 13 pages total.

*Primary Examiner* — William L Miller
(74) *Attorney, Agent, or Firm* — Francis J. Maguire; WARE FRESSOLA MAGUIRE & BARBER LLP

(57) ABSTRACT

A transmission element (6) includes—a first extreme portion (9) constrained to a connection element (5) by the coupling of a first cam (11) and a first pin (13), fixed in the first extreme portion (9) and on the connection element (5); —a second extreme portion (15) opposite to the first (9) and constrained to an elastic element (17) connected to a body (3); —an intermediate portion (19) between the first (9) and second (15) extreme portions constrained to the body (3) by the coupling of a second cam (21) and a second pin (23), obtained or fixed in the intermediate portion (19) and on the body (3). The transmission element (6) is constrained to the connection element (5) also by the coupling of a third cam (24) and a third pin (27), fixed in the transmission element (6) and on the connection element (5).

10 Claims, 10 Drawing Sheets

(58) Field of Classification Search
CPC ......... E05Y 2201/682; E05Y 2201/686; E05Y 2900/304; E05Y 2900/308; F24C 15/023; E05D 7/00
See application file for complete search history.

(56) References Cited

U.S. PATENT DOCUMENTS

| | | | | |
|---|---|---|---|---|
| 4,817,240 | A * | 4/1989 | Sovis, Jr. | F24C 15/023 16/322 |
| 9,121,211 | B1 * | 9/2015 | White | E05F 5/02 |
| 10,082,298 | B2 * | 9/2018 | White | E05F 3/20 |
| 11,268,313 | B2 * | 3/2022 | Terenzi | E05F 3/10 |
| 11,629,542 | B2 * | 4/2023 | Lee | E05D 3/18 16/304 |
| 11,702,878 | B2 * | 7/2023 | Terenzi | E05F 1/1276 16/286 |
| 12,448,830 | B2 * | 10/2025 | Lee | E05F 1/1253 |
| 12,546,482 | B2 * | 2/2026 | Collene | F24C 15/023 |
| 2003/0172920 | A1 * | 9/2003 | Gronbach | E05F 1/1261 126/197 |
| 2004/0172787 | A1 * | 9/2004 | Collene | E05F 1/1276 16/289 |
| 2007/0283532 | A1 * | 12/2007 | Vanini | F24C 15/023 16/277 |
| 2010/0251521 | A1 * | 10/2010 | Donoho | E05F 1/1261 16/343 |
| 2011/0037364 | A1 * | 2/2011 | Vanini | F24C 15/023 49/386 |
| 2015/0096148 | A1 * | 4/2015 | Gherardi | E05D 11/08 16/289 |
| 2016/0083992 | A1 * | 3/2016 | Xiao | E05D 13/1207 16/323 |
| 2016/0215550 | A1 * | 7/2016 | Xiao | E05D 7/12 |
| 2017/0059176 | A1 * | 3/2017 | SirLouis | E05D 3/02 |
| 2017/0260785 | A1 * | 9/2017 | Vanini | E05F 1/1058 |
| 2018/0216832 | A1 | 8/2018 | White | |
| 2018/0320424 | A1 * | 11/2018 | Gherardi | F24C 15/023 |
| 2019/0353353 | A1 * | 11/2019 | White | F24C 15/023 |
| 2020/0240192 | A1 * | 7/2020 | Gherardi | E05F 15/611 |
| 2021/0071456 | A1 * | 3/2021 | Gherardi | E05F 1/1261 |
| 2021/0293070 | A1 * | 9/2021 | Terenzi | E05F 5/02 |
| 2022/0034140 | A1 * | 2/2022 | Terenzi | E05F 1/1276 |
| 2022/0145683 | A1 * | 5/2022 | Lee | E05F 1/1269 |
| 2023/0107073 | A1 * | 4/2023 | Terenzi | E05F 1/1253 16/221 |
| 2024/0200381 | A1 * | 6/2024 | Vanini | E05F 1/1261 |
| 2026/0033700 | A1 * | 2/2026 | Vanini | A47L 15/4261 |

FOREIGN PATENT DOCUMENTS

| | | | |
|---|---|---|---|
| EP | 3 655 608 | B1 | 9/2003 |
| WO | 20210165166 | A1 | 8/2021 |

* cited by examiner

FIG.2
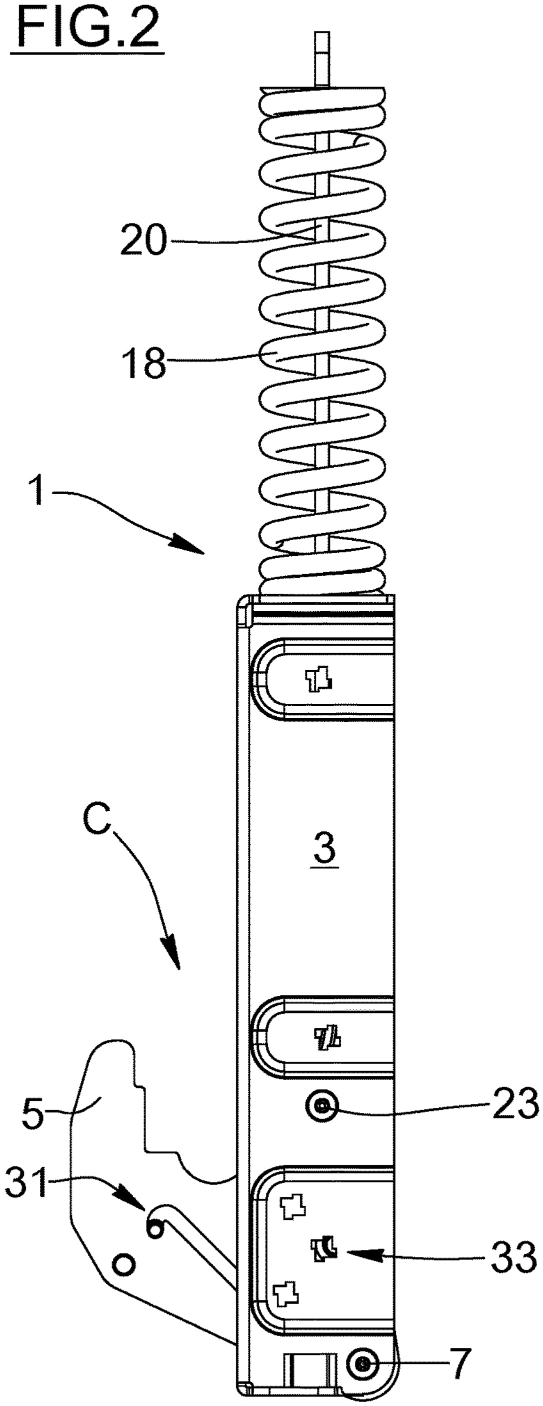
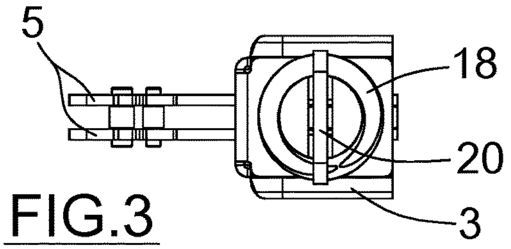
FIG.3
FIG.4
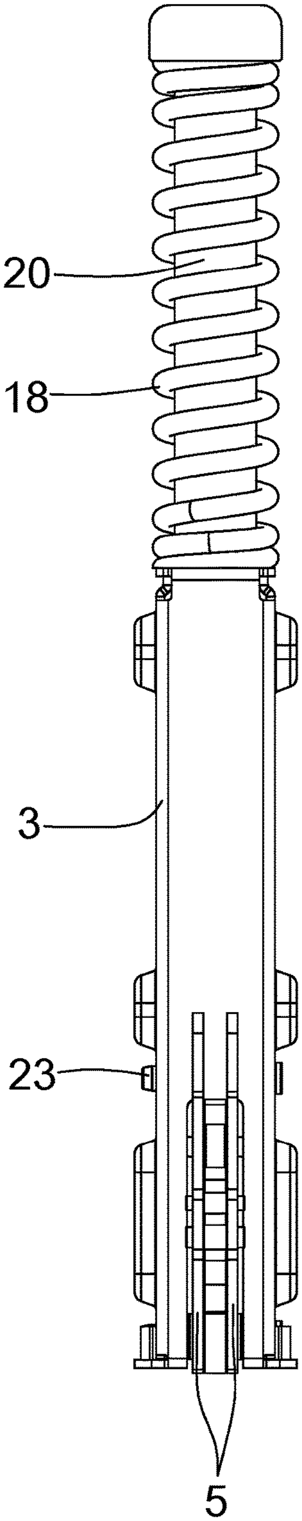

FIG.8
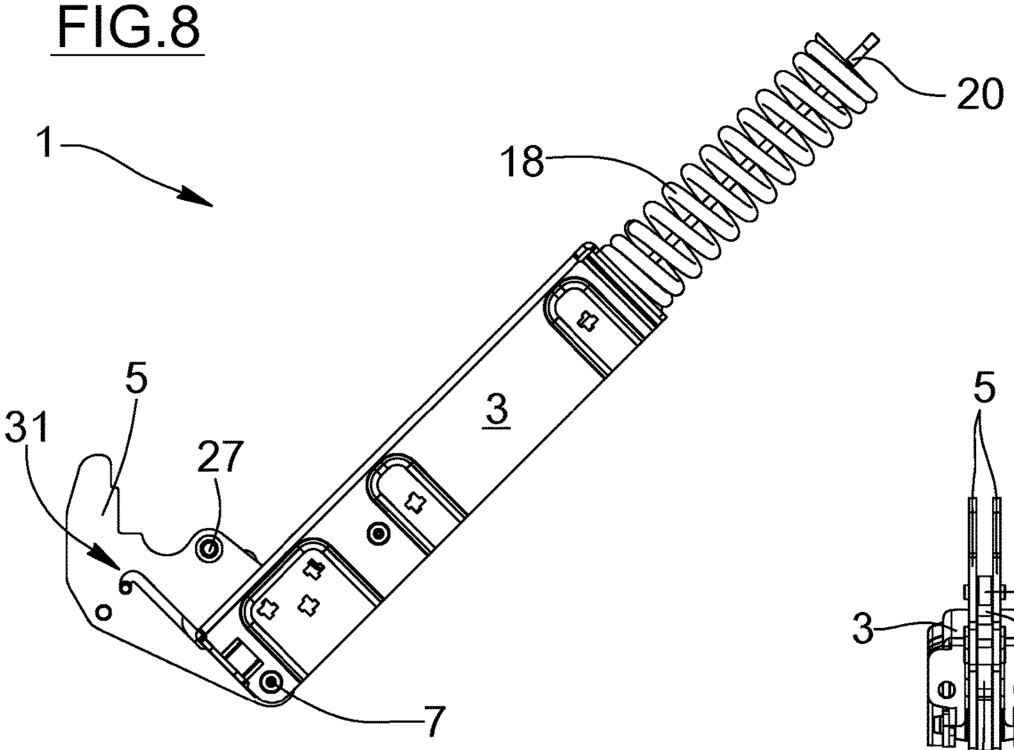
FIG.6
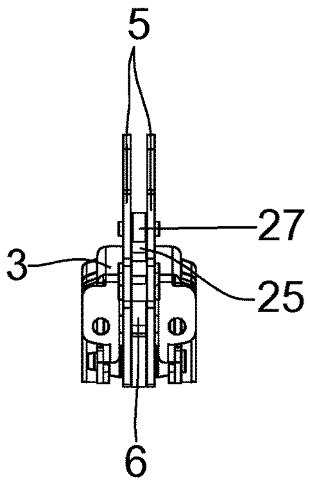
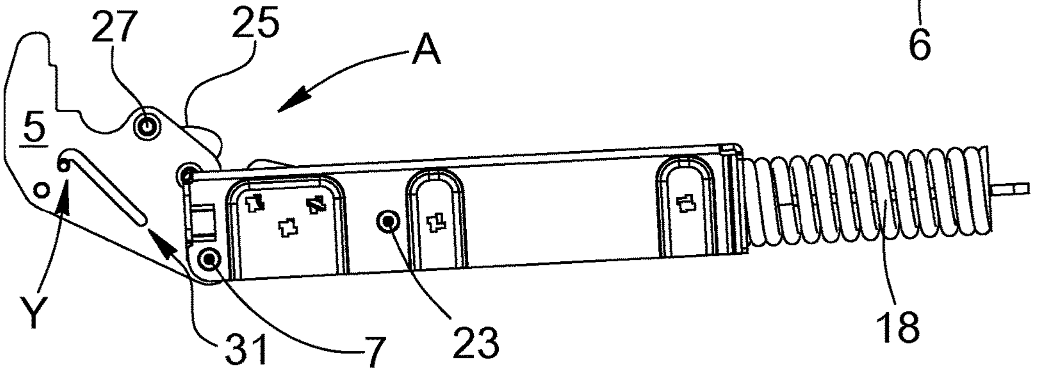
FIG.5
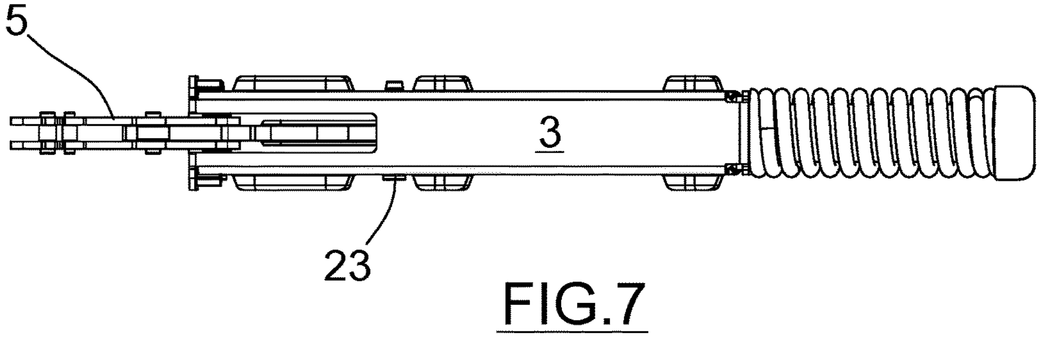
FIG.7

FIG.12
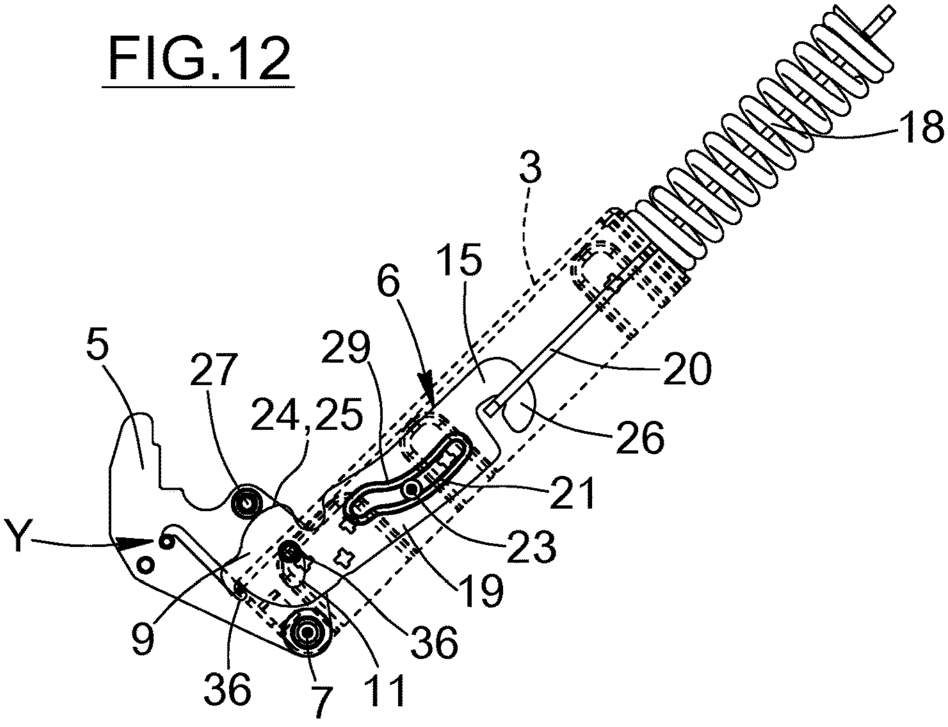
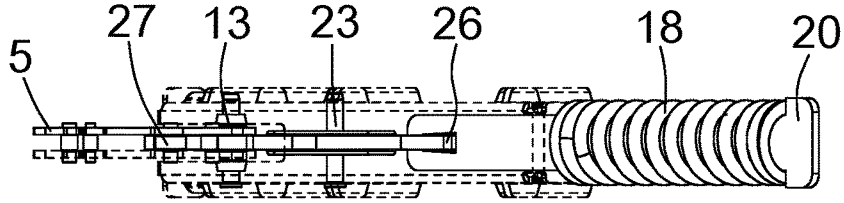
FIG.13
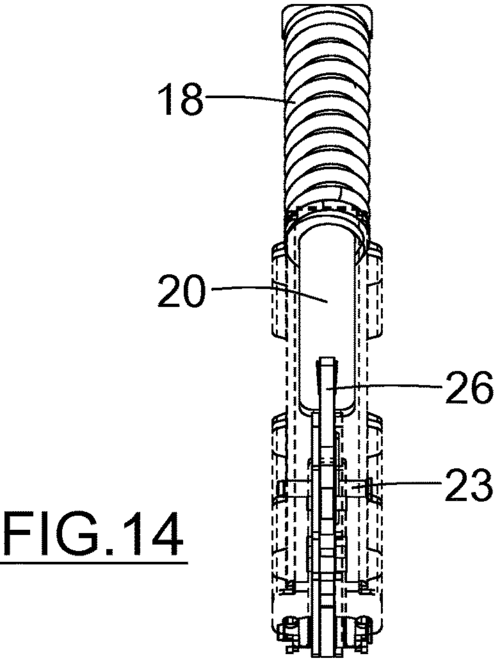
FIG.14

SIMPLIFIED MULTI-FUNCTION HINGE

TECHNICAL FIELD

The present invention relates to the technical field concerning the hinges for household appliances, furniture, furnishings and equipment provided with a closing door, and refers to a simplified multi-function hinge.

BACKGROUND ART

There are known hinges which are assigned to constrain a door of a piece of furniture or of a household appliance to a respective body, so as to allow a user to move the door between the open conditions and a closed condition. These known hinges are equipped with a connection element for the connection to the body of the household appliance, and with a body comprising elastic elements, which facilitate the actuation of the door at least in the closing or opening direction, and force transmission elements to transmit the force of the elastic elements to the connection elements. The connection elements, the transmission elements and the body of the hinge are provided with pins abutting with respective cams or shaped slots for the metastable positioning of the door at least in a predetermined position of weak stability A drawback of these known hinges consists in the fact that they are complex, and consequently delicate and noisy, as well as expensive due to the large number of components and the complexity required for their assembly.

Another drawback of the known hinges consists in the fact that often each of the connection elements and of the transmission elements carries both pins and cams, and that at least one pin is connected to an elastic element, consequently the machining of the individual components and their assembly are further complicated and costly in terms of time and money.

DISCLOSURE OF THE INVENTION

An object of the present invention is to propose a simplified hinge with multiple functions provided with a single elastic element.

Another object is to propose a simplified hinge with multiple functions in which the transmission element has cams and no pin, or vice versa, facilitating the production and the assembly of the components of the hinge itself.

BRIEF DESCRIPTION OF DRAWINGS

The characteristics of the invention are highlighted below with particular reference to the accompanying drawings in which:

FIG. 2 shows a side view of the hinge of FIG. 1 in its closed condition C;

FIG. 3 shows a top view of the hinge of FIG. 2;

FIG. 4 shows a front view of the hinge of FIG. 2;

FIG. 5 shows a side view of the hinge of FIG. 1 in its maximum opening condition A;

FIG. 6 shows a front view of the hinge of FIG. 5;

FIG. 7 shows a top view of the hinge of FIG. 5;

FIG. 8 shows a side view of the hinge of FIG. 1;

FIGS. 12-14 show schematic views in partial transparency of the hinge of FIG. 1 from respective side, top and front views;

BEST MODE TO CARRY OUT THE INVENTION

Figure 1:
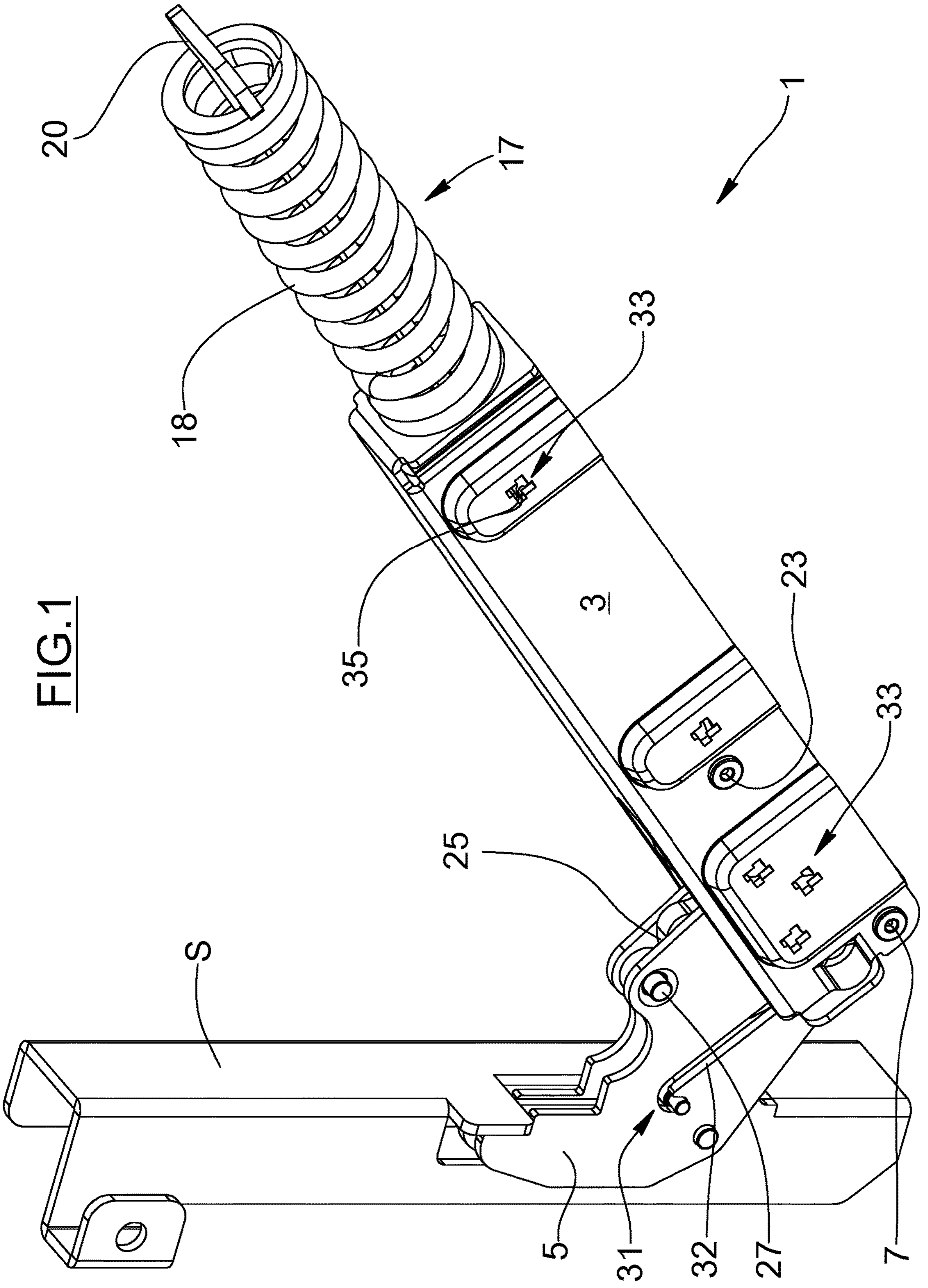
FIG. 1 shows an axonometric view of the simplified multi-function hinge object of the present invention, in its partially opened condition and associated with a support S for fastening to a household appliance.
Figure 9:
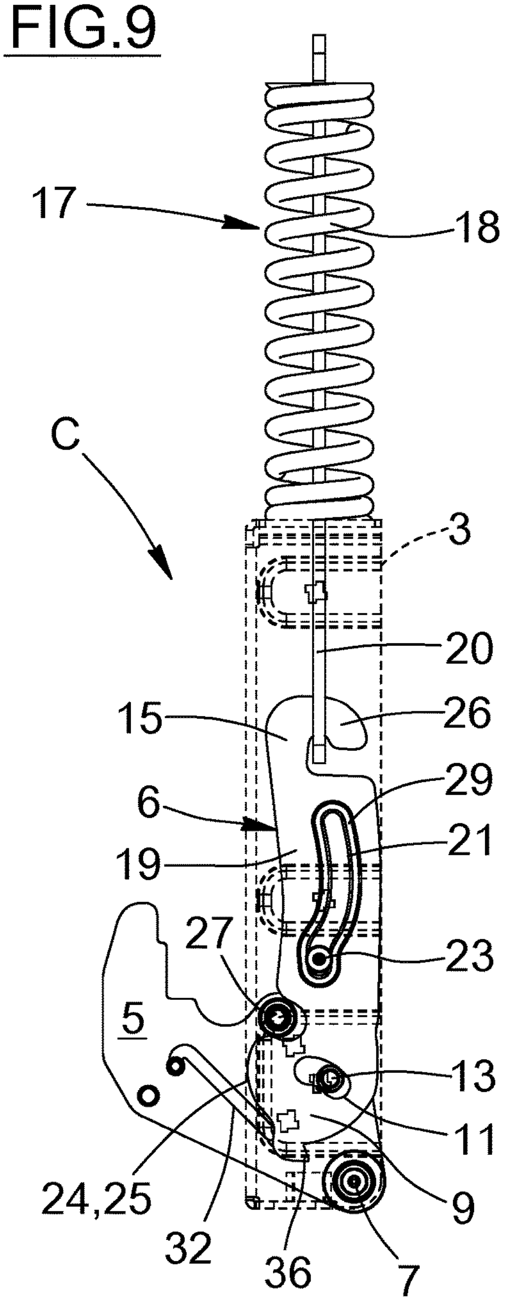
FIGS. 9-11 show schematic views in partial transparency of the hinge of FIG. 2 from respective side, front and top views.
Figure 11:
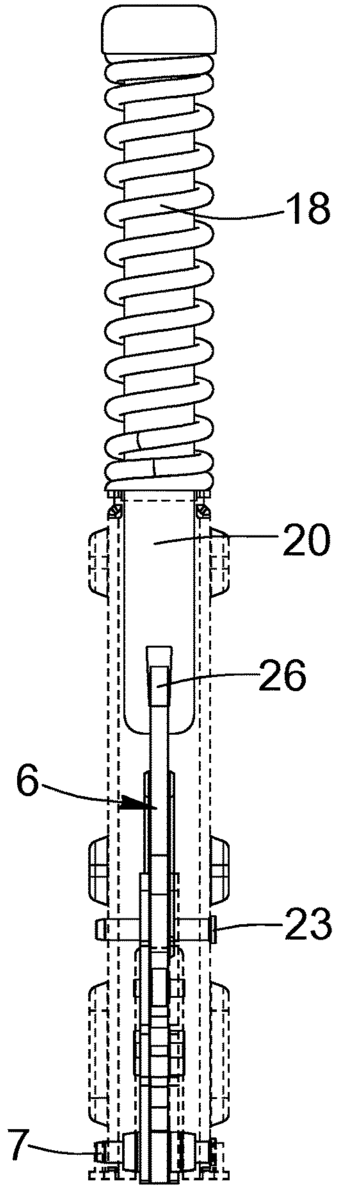
Figure 10:
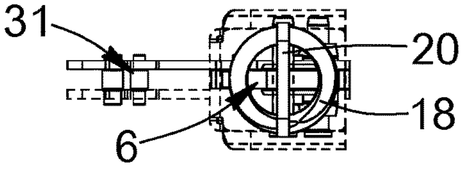
Figure 16:
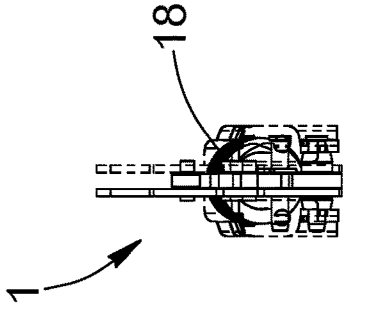
FIGS. 15-17 show schematic views in partial transparency of the hinge of FIG. 5 from respective side, front and top views.
Figure 15:
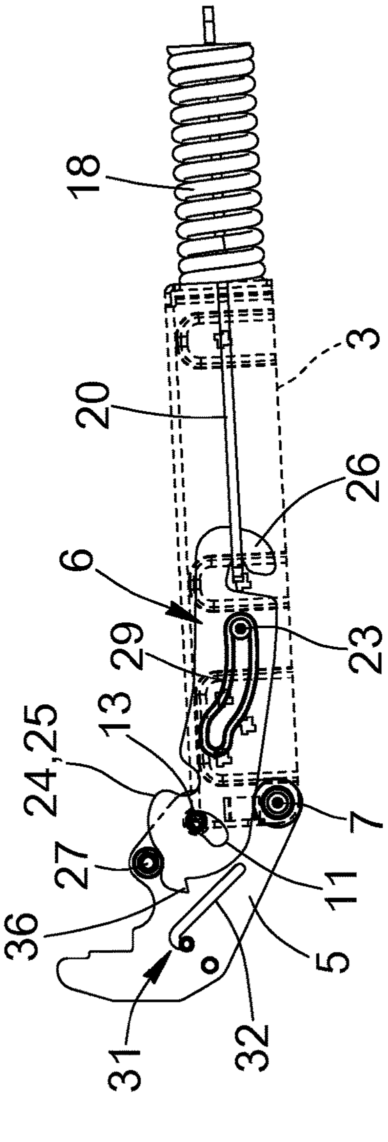
Figure 17:
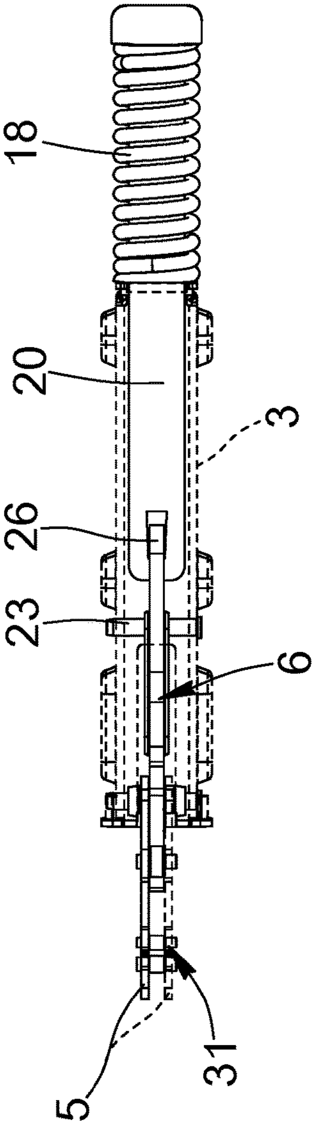
Figure 18:
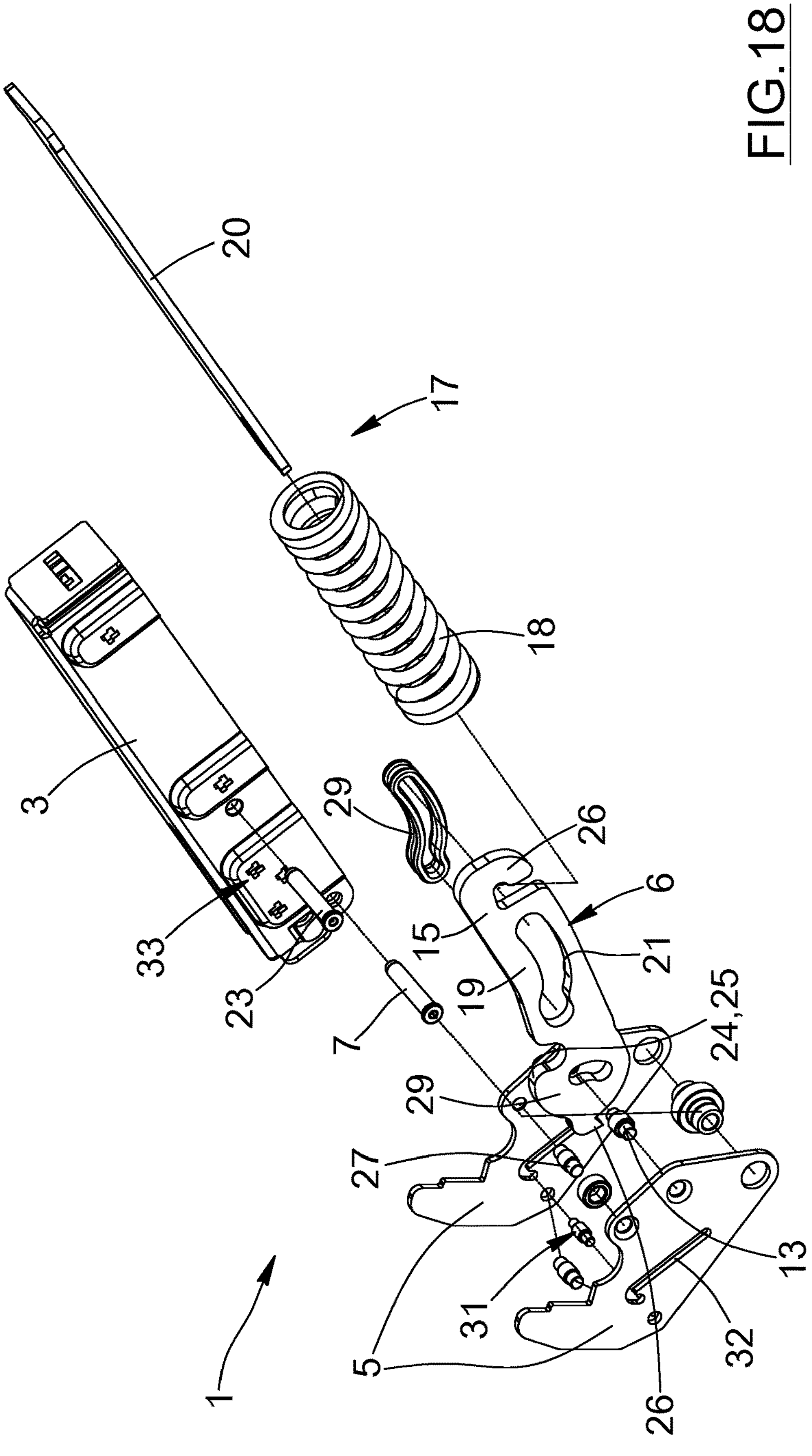
FIG. 18 shows an exploded axonometric view of the hinge of FIG. 1.

With reference to FIGS. 1-18, numeral 1 indicates the simplified multi-function hinge object of the present invention.

The hinge 1 comprises a body 3 and a connection element 5 mutually connected by means of a hinge pin 7 defining the hinge axis of the hinge itself.

The body 3 and the connection element 5 are assigned to be fixed preferably and respectively to a door and to the structure or frame of a household appliance such as an oven or a dishwasher, or vice versa the body 3 and the connection element 5 are respectively fixed to the frame and to the door of such household appliance. Alternatively, the invention provides that such device can be used as a hinge for furniture, furnishings and the like.

The body 3 and the connection element 5 can rotate with respect to each other around the hinge axis between a closed condition C of the hinge 1, in which the appliance door closes an opening of an internal volume of the appliance itself, and a maximum opening condition A of the hinge 1, in which the door forms a maximum opening angle with the plane defined by the edge of the opening.

The hinge 1 also comprises an elastic element 17 connected to the body 3 and to a transmission element 6, shaped as a plate or elongated slab, by means of which it 6 transmits an elastic closing force between the body 3 and the connection element 5, in other word said force tends to bring the hinge 1 towards the closed condition C.

A first cam 11, preferably constituted by a respective slot formed through the thickness of the transmission element 6 in a first extreme portion 9 thereof, is coupled with a first pin 13 fixed to the connection element 5, thus constraining the first extreme portion 9 of the transmission element 6 to the connection element 5. Alternatively, the first cam 11 can consist of a shaped edge of an open concavity or slot or of a protruding protrusion of the transmission element 6.

The first extreme portion 9 consists of the portion of the transmission element 6 closest to the hinge pin 7.

A second extreme portion 15 of the transmission element 6, opposite the first extreme portion 9, is constrained to the elastic element 17 connected to the body 3, e.g., by being seated on the body 3.

A second cam 21, constituted by a respective slot obtained in an intermediate portion 19 of the transmission element 6 located between the first 9 and second 15 extreme portions, is coupled with a second pin 23 fixed to the body 3, thus constraining the intermediate portion 19 of the transmission element 6 to the body 3.

The slots of the first cam 11 and of the second cam 21 have a transversal dimension (that is the width) equal to or slightly greater than the diameter of the respective first pin 13 and second pin 23, which are each slidably inserted through the respective cam 11, 21.

A third cam 24, consisting of a shaped edge 25 of the free end of the first extreme portion 9 of the transmission element 6, is coupled with a third pin 27 fixed to the connection element 5, constituting a further constraint between the transmission element 6 and the connection element 5.

The body 3 is a metal profile U-shaped or with a hollow rectangular section, one end of which is pivoted to the hinge pin 7.

The connection element 5 is preferably constituted by two shaped slabs equal and parallel to each other, mutually spaced by a distance such as to allow the insertion between them of the first extreme portion 9 of the transmission element 6. The connection element 5 can be removably fixed to the body of the household appliance, or to a receiver thereof or support S, by being fitted into a suitable seat of the latter, or by means of screws.

The first pin 13 and the third pin 27 are fixed between the two shaped slabs of the connection element 5 perpendicularly to these; the second pin 23 is fixed inside the body 3, between two opposite faces of the latter, parallel to the first pin 13, the third pin 27 and the hinge pin 7.

The second extreme portion 15 of the transmission element 6, that is the end thereof opposite the shaped edge 25, has an attack 26 conformed by shaping the second extreme portion 15 itself and assigned for the connection with the elastic element 17, which it is an air piston or preferably a coil spring 18.

The spring 18 is preferably acting in compression, with one end connected to the end of the body 3 opposite the pivoted end of the latter, and provided with a spring guide 20 connected between the opposite end of the spring 18 itself and the attack 26 of the transmission element 6.

Alternatively, the spring 18 acts in traction, with one end connected to the end of the body 3 opposite to the pivoted end of such and with the opposite end, which is directed towards the hinge pin 7, connected to said attack 26.

The first cam 11 that is almost arc of circle shape whose development, that is its chord or interpolating straight line, is approximately perpendicular to the longitudinal development of the transmission element 6 and whose concavity faces in the opposite direction to the second extreme portion 15.

The second cam 21 has an almost elongated “S” shape, that is in the shape of an inflection, and therefore has two consecutive concavities facing in opposite directions, and has any development, preferably approximately parallel to the longitudinal development of the transmission element 6.

The shaped edge 25 is curvilinear and is obtained along the edge of the first extreme portion 9 of the transmission element 6 and interacts with the third pin 27.

The first cam 11, the second cam 21 and the third cam 24 are shaped and conformed in such a way that the third pin 27 abuts and is always in contact with the third cam 24 itself between the closed C and maximum opening A conditions of the hinge 1. The shapes and positions of the first, second and third cams and the positions of the respective pins contribute to determining the behaviour of the hinge and can be modified to obtain a certain behaviour, motion or function.

For example, the third cam 24 preferably has concavities and convexities defining metastable, i.e., weakly stable positions for the respective third pin 27. These metastable positions can for example correspond to at least one of the two end stroke positions of the third pin 27 along the third cam 24, in other words at the closed C and/or maximum opening A conditions of the hinge 1, but they can also correspond to further intermediate conditions of the hinge 1, at predetermined partial opening angles of the hinge 1 itself.

Preferably, the hinge 1 also comprises at least one friction element 29 made of elastically compressible material, for example plastic, silicone or rubber, metal, and others having resilience, fixed along the edge of the second cam 21. The friction element 29 is such as to make the transversal dimension of the lumen of the second cam 21 slightly smaller than the diameter of the respective second pin 23, so as to oppose resistance to the sliding of such and to the mutual rotation of the body 3 and of the connection element 5 of the hinge 1. The friction elements 29 are for example constituted by a gasket fixed by interlocking along the edge of the second cam 21 to form a sort of frame for the slot of the cam itself.

Alternatively or in addition, further friction elements can be fixed along the edge of the first cam 11 so as to oppose the sliding along it of the respective first pin 13.

Optionally, at least one of the first pin 13, the second pin 23 and the third pin 27 carries a roller assigned to reduce the sliding friction of the pin itself along the respective first cam 11 or second cam 21 or third cam 24 to avoid jamming or irregularities. Preferably, in particular, the third pin 27 is provided with a roller to make its sliding along the third cam 24 smoother and more fluid.

Preferably, the hinge 1 also comprises shaped holes 33 formed on the body 3 for fastening the latter to the household appliance by means of respective screws. Each of these shaped holes 33 has a broken shape approximately like a pinwheel having one or more protrusions 35, teeth or fins, preferably four protrusions, projecting towards the inside of the shaped hole 33 itself and such that the minimum diameter of the shaped hole 33 is slightly smaller than the diameter of the respective screw. These protrusions 35 are assigned to be irreversibly deformed during the screwing of the respective screw to improve the grip of the screw itself to the respective shaped hole 33 and therefore to the body 3, also reducing the risk of accidental unscrewing.

Preferably, the hinge 1 also comprises a blocking element 31 constrained to the connection element 5 and which can be operated manually, in correspondence with the maximum opening condition A of the hinge 1, between an interference state X in which the blocking element 31 interferes with a blocking matching part 36 of the transmission element 6 to prevent the hinge 1 from reaching its closed condition C, and a disengagement state Y of the blocking element 31, in which it does not interfere with the transmission element 6 leaving the hinge 1 free to be operated between its closed C and maximum opening A conditions.

The blocking element 31 preferably consists of a pin or latch slidably constrained between two elongated slots 32 each formed in a respective shaped slab of the connection element 5 and oriented almost in the direction towards the hinge pin 7. The two ends of the elongated slots 32 constitute the two conditions, for blocking and unblocking the hinge, for such pin or latch of the blocking element 31. The disengagement state Y of the blocking element 31 is reached by the latter at the end of the elongated slots 32 furthest from the hinge pin 7, while when the blocking element 31 is at the opposite end of the elongated slots 32, in other words at the end closest to the hinge pin 7, it is in its interference state X and interferes with the blocking matching part 36 which protrudes outwards from the first extreme portion 9 of the transmission element 6, preventing the rotation of the transmission element 6 itself and of the body 3 towards the closed condition C of the hinge 1.

A variant of the hinge 1 provides that the first cam 11 is obtained in the connection element 5 and that the respective first pin 13 is fixed to the first extreme portion 9 of the transmission element 6, and/or that the second cam 21 is double and made in two side walls of the body 3 with the respective second pin 23 fixed to the intermediate portion 19 of the transmission element 6 so that it protrudes from both sides of the latter 6, and/or that the third cam 24 is fixed or obtained in the connection element 5 or is obtained on the edges of the slabs of such connection element 5 and that the respective third pin 27 is fixed to the first extreme portion 9 of the transmission element 6 protruding from both sides. Naturally, these cams 11, 21, 24 arranged as above described are in any case shaped so that the third pin 27 always results in sliding abutment with the third cam 24.

Figure 20:
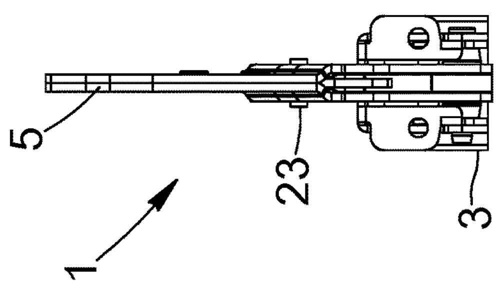
FIGS. 19-21 show side, front and top views, respectively, of a variant of the hinge of FIG. 1, in the maximum opening condition A.
Figure 19:
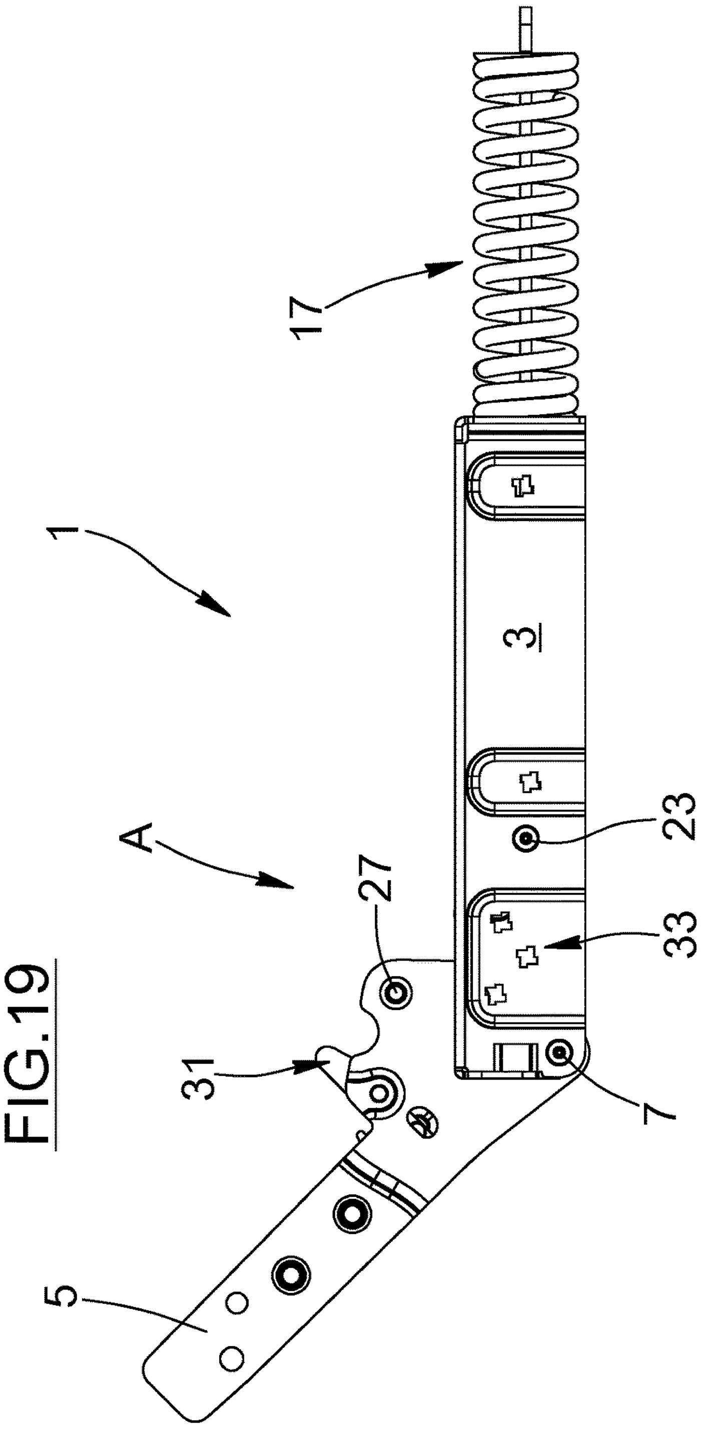
Figure 21:
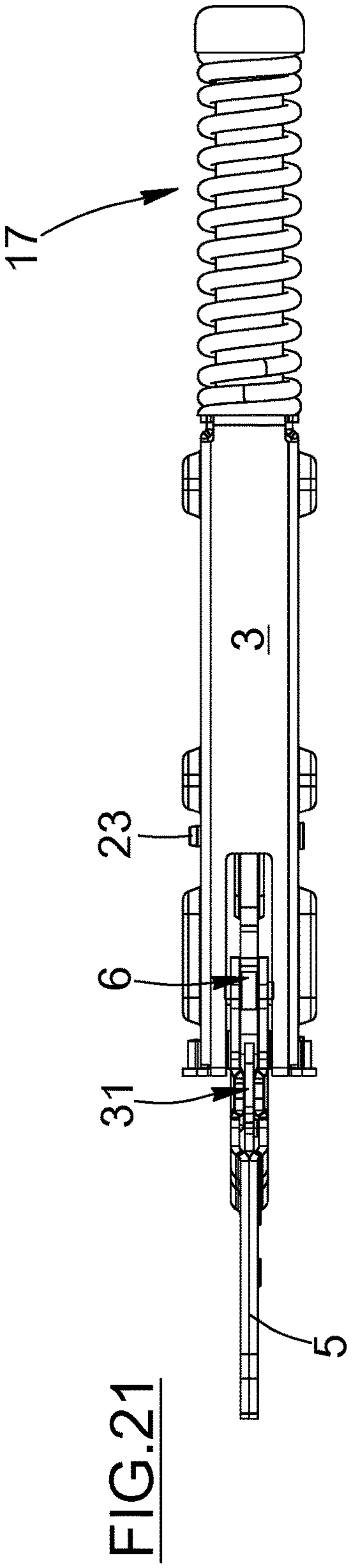
Figures 22, 23, 24:
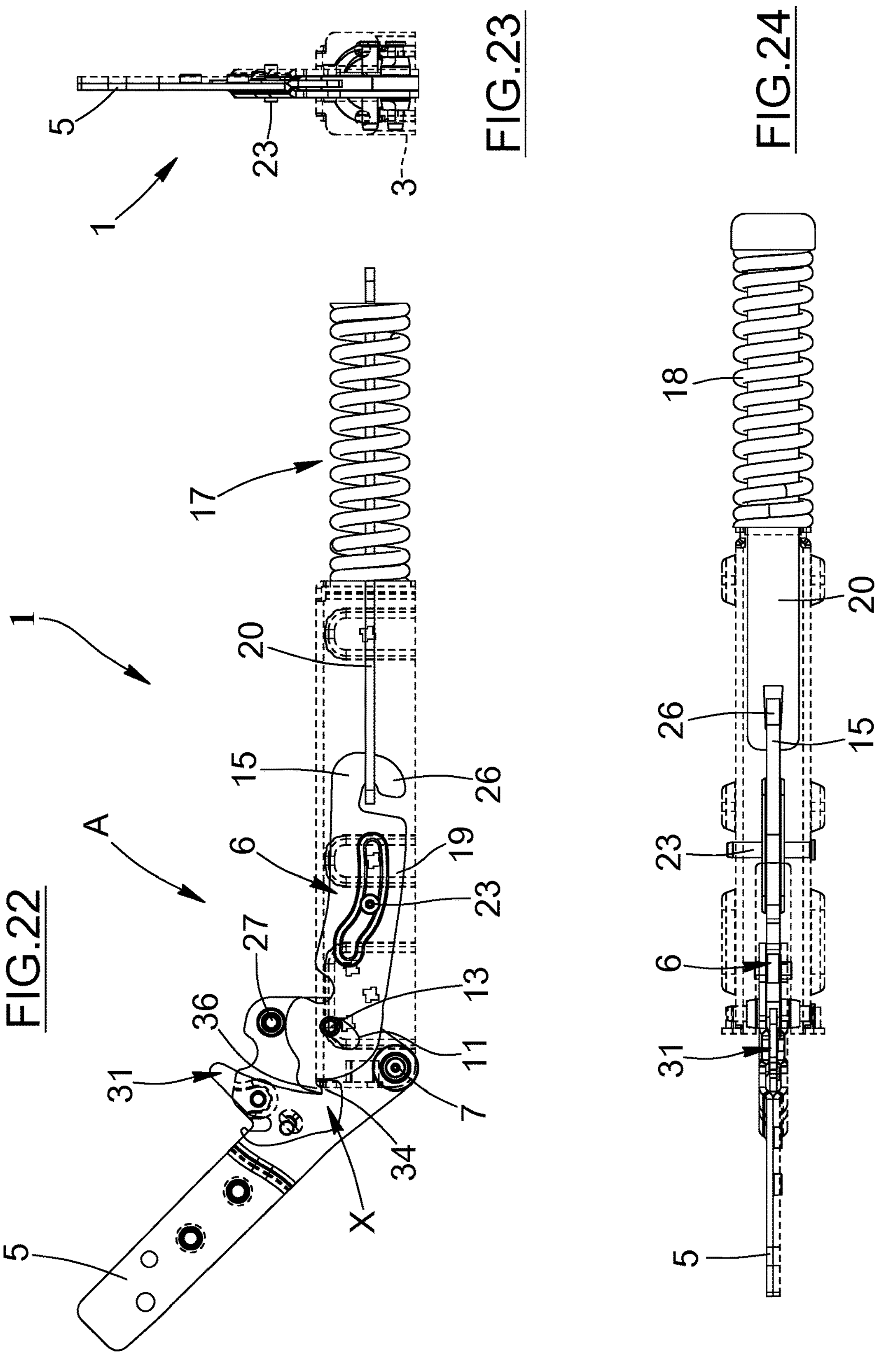
FIGS. 22-24 show schematic views in partial transparency of the hinge of FIG. 19.
Figure 25:
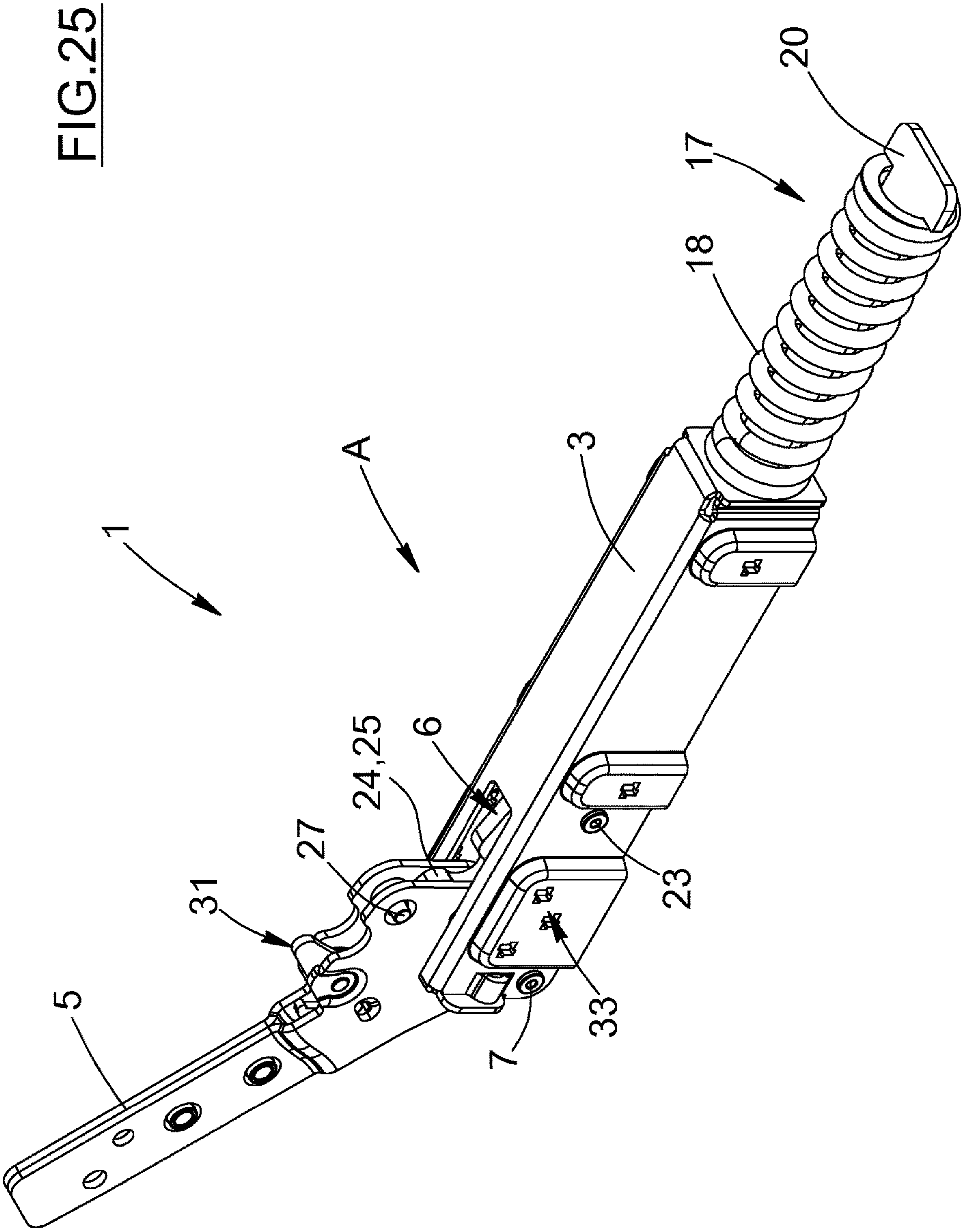
FIG. 25 shows an axonometric view of the hinge of FIG. 19.

With reference now to the variant of FIGS. 19-25, the hinge 1 comprises a blocking element 31 consisting of a lever or pawl pivoted to the connection element 5 and operable, by means of a portion of the blocking element 31 itself accessible from the outside of the hinge 1, between the disengagement state Y and the interference state X, in correspondence with which a hooking end 34 of the blocking element 31 protruding from it, engages with the blocking matching part 36 of the transmission element 6 to prevent the sliding of the third cam 24 against the third pin 27, in other words to prevent the movement of the transmission element 6 with respect to the connection element 5 and to block the body 3 in the maximum opening condition A of the hinge 1.

An advantage of the present invention is that of providing a simplified multi-functions hinge equipped with a single elastic element 17.

Another advantage is that of providing a simplified multi-functions hinge in which the transmission element 6 only carries cams and no pin, or vice versa, facilitating the production and assembly of the components of the hinge 1 itself.

The invention claimed is:

1. A simplified multi-function hinge comprising a body (3) and a connection element (5) mutually connected by a hinge pin (7), said body (3) and connection element (5) configured for fixation respectively to a door and to a frame or structure of an appliance or vice versa, and configured for rotation with respect to each other between a closed condition (C) of the hinge (1), in which the door closes an opening of the appliance frame or structure, and a maximum opening condition (A) of the hinge (1), in which the door forms an angle of maximum opening with a plane defined by an edge of the opening; said hinge (1) also comprising an elastic element (17) connected to the body (3) to transmit, via a transmission element (6), an elastic closing force to the connection element (5); the hinge (1) wherein the transmission element (6) comprises:

- a first extreme portion (9) constrained to the connection element (5) by a coupling of a first cam (11) and a first pin (13), fixed respectively in the first extreme portion (9) and on the connection element (5) or vice versa;
- a second extreme portion (15) opposite to the first extreme portion (9) and constrained to the elastic element (17) connected to the body (3);
- an intermediate portion (19) between the first extreme portion (9) and the second extreme portion (15) constrained to the body (3) by the coupling of a second cam (21) and a second pin (23), fixed respectively in the intermediate portion (19) and on the body (3) or vice versa;
- wherein said transmission element (6) is constrained to the connection element (5) also by a coupling of a third cam (24) and a third pin (27), fixed respectively in the transmission element (6) and on the connection element (5) or vice versa.

2. The hinge according to claim 1, wherein the third cam (24) comprises a shaped edge (25) of the first extreme portion (9) and wherein the third pin (27) is fixed to the connection element (5).

3. The hinge according to claim 2, wherein the shaped edge (25), the first cam (11) and the second cam (21) are formed in the transmission element (6), the transmission element that has an elongated shape and an end opposite to the shaped edge (25) has an attack (26) for the elastic element (17), the elastic element (17) comprising a spring (18) operating in traction or a compressed spring (18) provided with a spring guide (20) connected to said attack (26).

4. The hinge according to claim 3, wherein the first cam (11) has an arc shape extending substantially perpendicular to the longitudinal dimension of the transmission element (6), and/or the second cam (21) has a generally "S" shape extending substantially parallel to the longitudinal dimension of the transmission element (6), and/or the shaped edge (25) extends substantially parallel to the longitudinal dimension of the transmission element (6) or inclined, with the first cam (11), the second cam (21) and the third cam (24) shaped in such a way that the third pin (27) is always in contact with the third cam (24) between the closed (C) and maximum opening (A) conditions of the hinge (1).

5. The hinge according to claim 1, wherein the first cam (11) comprises a respective slot formed in the first extreme portion (9) and that the first pin (13) is fixed to the connection element (5) and/or the second cam (21) comprises a respective slot formed in the intermediate portion (19) and the second pin (23) is fixed to the body (3).

6. The hinge according to claim 1, wherein the third cam (24) has concavities and convexities defining weakly stable positions for the third pin (27) corresponding to respective said conditions of the hinge (1).

7. The hinge according to claim 1, further comprising friction elements (29) of elastically compressible material are fixed along an edge of at least one of the first cam (11) and the second cam (21) to make a transversal dimension of the first cam (11) and/or of the second cam (21) less than a diameter of the respective first pin (13) or second pin (23), so as to oppose sliding.

8. The hinge according to claim 1, further comprising a blocking element (31) constrained to the connection element (5) and operable, close to the maximum opening condition (A), between an interference state (X) of the blocking element (31), in which the blocking element interferes with the transmission element (6) to prevent the hinge (1) from reaching the closed condition (C), and a disengagement state (Y) of the blocking element (31), in which the blocking element does not interfere with the transmission element (6).

9. The hinge according to claim 1, further comprising shaped holes (33) formed on the body (3) for fixing the body to the appliance by respective screws, each of the shaped holes (33) having protrusions (35) projecting towards an inside of the shaped hole (33) configured for irreversibly deforming during screwing of the respective screw to improve grip.

10. The hinge according to claim 1, wherein at least one of the first pin (13), the second pin (23) and the third pin (27) has a roller to facilitate sliding along the respective first cam (11) or second cam (21) or third cam (24).

* * * * *